United States Patent [19]

Retterath

[11] Patent Number: 4,663,756

[45] Date of Patent: May 5, 1987

[54] MULTIPLE-USE PRIORITY NETWORK

[75] Inventor: James E. Retterath, Eagan, Minn.

[73] Assignee: Sperry Corporation, Blue Bell, Pa.

[21] Appl. No.: 770,829

[22] Filed: Aug. 29, 1985

[51] Int. Cl.$^4$ .............................................. H04J 3/02
[52] U.S. Cl. ....................................... 370/85; 370/95; 340/825.5
[58] Field of Search ........................ 370/85, 86, 89, 95; 340/825.5, 825.51

[56] References Cited

U.S. PATENT DOCUMENTS

| | | | |
|---|---|---|---|
| 4,232,294 | 11/1980 | Burke et al. | 340/825.5 |
| 4,295,122 | 10/1981 | Hatada et al. | 340/825.5 |
| 4,342,995 | 8/1982 | Shima | 340/825.5 |
| 4,462,029 | 7/1984 | Neumann et al. | 340/825.5 |

OTHER PUBLICATIONS

A. L. Bergey, Jr., Increased Computer Throughput by Conditioned Memory Data Prefetching, IBM Technical Disclosure Bulletin, vol. 20, No. 10, Mar. 1978, p. 4103.

Primary Examiner—Douglas W. Olms
Assistant Examiner—Wellington Chin
Attorney, Agent, or Firm—Glenn W. Bowen

[57] ABSTRACT

A multiple user priority network is provided by a double section priority PROM. One section of the PROM is accessed by a current priority code stored in a priority register, and new request signals that appear on lines that are coupled to the requesting components to provide an address which contains a new access code. The second section of the PROM is accessed by the new access code, which is stored in a channel access code register, and the current priority code in the priority register to provide an address which contains a new priority code. The multiple user priority network of the present invention is thus capable of providing a updated priority for all of the requesting devices which is a function of the changes in the request status of the devices. The particular described implemented embodiment is a modified least-recently-used algorithm in which when more than one device is requesting access to a bus, the device which is currently in control will upon the initiation of the next cycle be assigned the lowest priority, and each of the other channels will have their priority increased by one.

3 Claims, 1 Drawing Figure

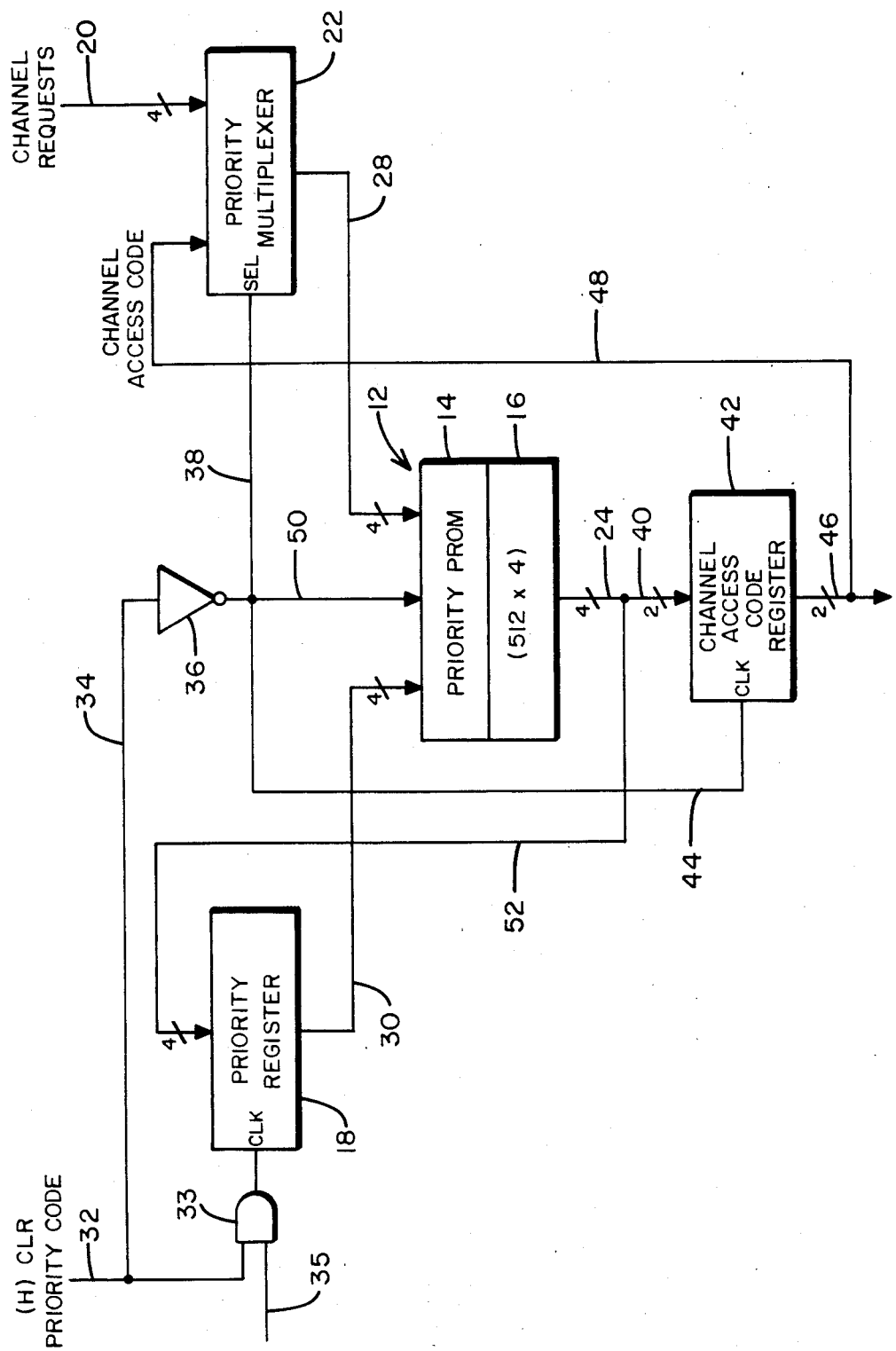

MULTIPLE-USE PRIORITY NETWORK

The U.S. Government has a paid-up license in this invention and the right in limited circumstances to require the patent owner to license others on reasonable terms as provided for by the terms of a Government contract.

BACKGROUND OF THE INVENTION

Various priority systems have been employed for honoring priority requests from a number of different components or elements of a data processing, or information transmitting, system. These priority schemes vary from those in which certain components will always have a higher priority than others, to systems in which the requesting elements are to be provided with equal access time. An example of an ordered priority requesting system is shown in Henzel, et al., U.S. Pat. No. 3,832,692. An example of a pre-emptive rotational priority system is shown in the Danilenko, et al. U.S. Pat. No. 4,009,470.

The present invention is directed to a novel priority system in which the priority scheme may be modified merely by exchanging a programmable read only memory (PROM) with one that is programmed differently. By replacement of the PROM a different number of channels may also be implemented. The network of the present invention may also be added to systems with a nested priority structure.

The priority implementation techniques employed in the prior art require dedicated circuitry in order to implement a particular set priority scheme. In order to obtain a different type of priority scheme, the entire structure would have to be redesigned. With the present invention a particular priority scheme may be replaced with a different scheme merely by replacement of the PROM; or, if desired, different channels of the system may be operated under different priority schemes by dividing the PROM into different sections, each section of which may control a different number of components, such as I/O channels or memory banks.

SUMMARY OF THE INVENTION

The priority system of the present invention is implemented with a double section priority PROM, a priority register, a priority multiplexer and a channel access code register. The priority register contains the current priority code, which represents the current priority order of the requesting devices, or the order in which the requests by these devices will be honored. The priority multiplexer transmits a new set of requests through the priority multiplexer to the priority PROM. The requests transmitted by the priority multiplexer and the current priority code contained in the priority register access a PROM address which contains a new access code. The new access code is placed in a channel access code register, and it is then coupled through the priority multiplexer to be used in conjunction with the current priority code to access another PROM address which contains a new priority code.

In the implementation of the disclosed embodiment the new requesting signals are used in conjunction with the current priority code to provide a modified least recently used algorithm. After a channel has been honored its priority is reduced to the lowest priority, and the other channels have their priority values increased by one. In the particular described embodiment for four I/O channels not all of the possible combinations of priority codes are utilized. Instead a permutation of the actual codes that are used is implemented to obtain substantially equal usage of the common bus between the four I/O channels and to prevent any channel from being locked out from the bus by the other channels, while at the same time the memory requirements of system are reduced by the permutated codes.

BRIEF DESCRIPTION OF THE DRAWINGS

The drawing shows a block diagram representation of an embodiment of the multiple user priority network of the present invention.

TECHNICAL DESCRIPTION OF THE INVENTION

A particular embodiment of the present invention which substantially equally divides the time usage of a common bus between four input/output terminals of a data processing system is shown in the drawing. The priority network of the FIGURE incorporates a priority programmable read only memory (PROM) 12 which is divided into two sections 14, and 16. Each section of the priority PROM 12 has 256 four bit codes stored therein. The first section 14 of the PROM provides a two bit channel access code that determines which of the channels currently requesting access will be accessed next. The second section 16 of the PROM 12 provides a four bit encoded priority code which updates the priority sequence code following the accessing of a selected channel.

A priority register 18 contains the current four bit priority code. This code is used in conjunction with the current channel request signals on the four line channel request bus 20, which is coupled to the priority multiplexer 22, to provide a new four bit access code on the output bus 24 from the section 14 of the PROM 12. Thus, the state of the current priority code in the register 18 and the logic levels of the request lines of the channel request bus 20 will, upon receipt of appropriate timing pulses, select the PROM address of section 14 of the PROM 12 which contains the next access code. The two most significant bits of the access code are LOW logic level signals while the two least significant bits are used to select one of the four possible I/O channels.

The clocking of the current priority code on the line 30 to section 14 of the PROM 12 occurs when the clock signal that is supplied on the clock line 32 is at a HIGH logic level. This signal will be coupled through the AND gate 33 to the clock input terminal (CLK) of the register 18, assuming that the other input terminal 35 is at a high level at this time. The signal on the line 32 is a train of square wave pulse signals with a repetitive signal that alternates between a HIGH and a LOW logic level. For the implementation illustrated in the FIGURE the frequency of the square wave pulse may be on the order of 5 MHz so that currently available circuitry may provide the priority network with an access cycle time as low as 100 nanoseconds.

The clock signal on the line 32 is supplied to the line 34 where it is inverted by the inverter 36 and applied on the line 38 to the select input terminal (SEL) of the priority multiplexer 22. When the signal on the line 38 is at a logic low level the multiplexer will couple the signals on the channel request bus 20 to the input of section 14 of the PROM via lines 28. The four bits on the lines 30 thus correspond to a code representative of the current priority assigned to the input lines, and the four bits on the lines 28 represent the current channel request status of the lines of the bus 20. An address in section 14 which contains the new access code based upon the information in the register 18 and on the channel request bus 20 is thereby provided.

In the illustrated embodiment only four I/O channels are implemented. The two bits required to specify these new channel access codes are supplied on the output lines 40 to the channel access register 42. A LOW signal on the output of the inverter 36 is also supplied to the clock input terminal (CLK) of the channel access code register 42 on the line 44. When the line 44 transitions from a LOW level to a HIGH level the two bits representative of the new channel access code will be stored in the channel access code register 42.

When the timing signal on the line 32 drops to a LOW logic level the output of the inverter 36 on the lines 38 and 44 goes to a HIGH level, which allows the access codes stored in the register 42 to be supplied on the lines 46 and 48 to the multiplexer 22, so that line 28 supplies the new channel access code rather than the channel request signal. Since there are four lines on the bus 28 the two most significant bus lines will provide a logic LOW level for the four I/O channel implementation of the FIGURE.

The current priority code is retained in the priority register 18 at this time and the current priority code on the lines 30 are now used in conjunction with the signals on the lines 28 to address the PROM 12. At this time the output of the inverter 36 on the most significant bit line 50 to the PROM 12 is at a HIGH level which selects section 16 instead of section 14 of the PROM. Thus the current priority code signals on the lines 30 and the current channel access code on the lines 28 will select the address of section 16 of the PROM which contains a new priority code. When the clock signal on the line 32 again goes to a high level the new priority code from section 16 of the PROM will be clocked from lines 52 into the priority register 18 to complete the prioritized access cycle.

In the described embodiment the requesting channel data on the lines 20 and the current priority code; in the register 18 were used to select a new access code and the new access code was then used in conjunction with the current priority code to select an updated priority code for each accessing cycle. The use of the system of the present invention for accessing portions of a data processing system or I/O terminals with faster access time requirements than 100 nanoseconds may necessitate that accessing be done only after a particular terminal has not received service for a predetermined period of time. An AND gate 33 may be provided for this purpose so that the updating of the priority register 18 for a new accessing cycle may be initiated only when the I/O equipment which has not been serviced for a predetermined period of time supplies a HIGH signal on the line 35 to activate the AND gate 33.

The present invention is desirably employed in an environment where the time of usage between four I/O channels is equally divided and where it is not possible for any single channel to be locked out from the bus by the other channels. The particular priority scheme of the described network however is only one implementation of the present invention and the priority sequence can be altered simply by replacing the PROM with one that is programmed differently. The present invention can easily be expanded for implementation in systems with a greater number of channels, and it can be used in systems which employ a nest priority structure.

The algorithm of the present invention is based upon a least recently used algorithm. After a given channel is granted a bus cycle it is given the lowest priority and all channels that were previously lower in priority are moved up one position, with the exception that not all possible priority code permutations are implemented in the described embodiment in order to reduce the size of the PROM. This shifting of priority order is reflected in the new priority code which is received from section 16 of the PROM. If only the lowest priority channel request a bus cycle, that channel will be granted the cycle and the channel priority code and the register 18 will remain unchanged. A full implementation of the above described algorithm would require 1024 five bit code storage locations in the PROM for for I/O channels. In order to lower the memory storage requirements of the PROM the present invention may be implemented with a reduced memory capacity by employing a 512 four bit code storage PROM, and by not utilizing certain priority combinations. To insure that the I/O channels are reserved on a substantially equal basis permutation of the priority codes that are specified occurs.

Table 1 shows the hexadecimal code that is associated with a priority sequence P for 16 priority combinations. Table 2 shows the unspecified sequences (P) that are not implemented in the PROM 12. For example the code zero represents a priority sequence of 0123. This means that top priority will be reserved for channel 0 and subsequently that channels 1, 2, and 3 will have decreasing priorities. On the other hand when the code is a hexadecimal A the channel code priority sequence (P) will be 1032 so that channel 1 will have top priority, channel 0 second priority, channel 3, third priority, and channel 2 the lowest priority. Table 3 shows the state of the lines on the channel request bus 20 for various combinations of channel requests. The channel 3 will be high and channels 2, 1 and 0 will be low, for example, when only channel 3 is requesting access. Although the signals on the bus 20 are not encoded signals they may be treated as code signals if channel 0 is considered to be the most significant bit and channel 3 is treated as the least significant bit of code word. In this case the signal on the channel request bus 20 may be treated as being equivalent to a code of 1 in a hexadecimal notation. As a further example, if all of the lines are requesting access the snapshot state of the request lines will be 0, 1, 2, 3 which as indicated in Table 3 shows that all fours channels are simultaneously requesting access, and this combination of signals is equivalent to a hexadecimal code F.

Table 4 shows the complete implementation of the reduced memory algorithm of the present invention for all of the various priority codes. For example, if the previous priority sequence, or P-old, is 0 1 2 3 and the current access code is a hexadecimal 0 this indicates that channel 0 is requesting service, and since it is the top priority channel according to the old priority code it will be serviced, and it then will be positioned so that it has the lowest priority, with the other channels being moved up for the next access channel. This would indicate that the new priority sequence, P-new, should be 1 2 3 0. However from Table 2 it is seen that a code for the priority sequence 1 2 3 0 was not provided in order to reduce the memory requirements, and the priority code that is actually used references the sequence P-actual, or 1 2 0 3. From Table 4 it is seen that the permutation of the actual priority code is provided in those instances where the new priority code, is not one that is implemented in a manner which will insure that substantially equal access time is provided to all of the channels, and that a lock out of one channel by the other channels is not possible.

TABLE 1

| Priority Code | P |
|---|---|
| 0 | 0123 |
| 1 | 0213 |
| 2 | 0132 |
| 3 | 0312 |
| 4 | 2301 |
| 5 | 2013 |
| 6 | 2310 |
| 7 | 2103 |
| 8 | 1023 |
| 9 | 1203 |
| A | 1032 |
| B | 1302 |
| C | 3201 |
| D | 3012 |
| E | 3210 |
| F | 3102 |

TABLE 2

| Unspecified P |
|---|
| 1230 |
| 0231 |
| 0321 |
| 1320 |
| 2130 |
| 2031 |
| 3021 |
| 3120 |

TABLE 3

| Channel Request Bus Status | Bus Code Equivalent | Bus Line Logic Level | | | |
|---|---|---|---|---|---|
| | | 0 | 1 | 2 | 3 |
| 3 | 1 | L | L | L | H |
| 2 | 2 | L | L | H | L |
| 23 | 3 | L | L | H | H |
| 1 | 4 | L | H | L | L |
| 13 | 5 | L | H | L | H |
| 12 | 6 | L | H | H | L |
| 123 | 7 | L | H | H | H |
| 0 | 8 | H | L | L | L |
| 03 | 9 | H | L | L | H |
| 02 | A | H | L | H | L |
| 023 | B | H | L | H | H |
| 01 | C | H | H | L | L |
| 013 | D | H | H | L | H |
| 012 | E | H | H | H | L |
| 0123 | F | H | H | H | H |

TABLE 4

| P-Old | Access Code | P-New | P-Actual |
|---|---|---|---|
| 0123 | 0 | 1230 | 1203 |
| 0123 | 1 | 0231 | 0213 |
| 0123 | 2 | 0132 | 0132 |
| 0123 | 3 | 0123 | 0123 |
| 0213 | 0 | 2130 | 2310 |
| 0213 | 1 | 0231 | 0213 |
| 0213 | 2 | 0132 | 0312 |
| 0213 | 3 | 0213 | 0213 |
| 0132 | 0 | 1320 | 1302 |
| 0132 | 1 | 0321 | 0312 |
| 0132 | 2 | 0132 | 0132 |
| 0132 | 3 | 0123 | 0123 |
| 2301 | 0 | 2310 | 2310 |

TABLE 4-continued

| P-Old | Access Code | P-New | P-Actual |
|---|---|---|---|
| 2301 | 1 | 2301 | 2301 |
| 2301 | 2 | 3012 | 3012 |
| 2301 | 3 | 2013 | 2013 |
| 2013 | 0 | 2130 | 2103 |
| 2013 | 1 | 2031 | 2013 |
| 2013 | 2 | 0132 | 0132 |
| 2013 | 3 | 2013 | 2013 |
| 2310 | 0 | 2310 | 2310 |
| 2310 | 1 | 2301 | 2301 |
| 2310 | 2 | 3102 | 3102 |
| 2310 | 3 | 2103 | 2103 |
| 2103 | 0 | 2130 | 2103 |
| 2103 | 1 | 2031 | 2301 |
| 2103 | 2 | 1032 | 1302 |
| 2103 | 3 | 2103 | 2103 |
| 1023 | 0 | 1230 | 1203 |
| 1023 | 1 | 0231 | 0213 |
| 1023 | 2 | 1032 | 1032 |
| 1023 | 3 | 1023 | 1023 |
| 1203 | 0 | 1230 | 1203 |
| 1203 | 1 | 2031 | 2013 |
| 1203 | 2 | 1032 | 1032 |
| 1203 | 3 | 1203 | 1203 |
| 1032 | 0 | 1320 | 1302 |
| 1032 | 1 | 0321 | 0312 |
| 1032 | 2 | 1032 | 1032 |
| 1032 | 3 | 1023 | 1023 |
| 1302 | 0 | 1320 | 1302 |
| 1302 | 1 | 3021 | 3201 |
| 1302 | 2 | 1302 | 1302 |
| 1302 | 3 | 1023 | 1203 |
| 0312 | 0 | 3120 | 3210 |
| 0312 | 1 | 0321 | 0312 |
| 0312 | 2 | 0312 | 0312 |
| 0321 | 3 | 0213 | 0213 |
| 3201 | 0 | 3210 | 3210 |
| 3201 | 1 | 3201 | 3201 |
| 3201 | 2 | 3012 | 3012 |
| 3201 | 3 | 2013 | 2013 |
| 3012 | 0 | 3120 | 3102 |
| 3012 | 1 | 3021 | 3012 |
| 3012 | 2 | 3012 | 3012 |
| 3012 | 3 | 0123 | 0123 |
| 3210 | 0 | 3210 | 3210 |
| 3210 | 1 | 3201 | 3201 |
| 3210 | 2 | 3102 | 3102 |
| 3210 | 3 | 2103 | 2102 |
| 3102 | 0 | 3120 | 3102 |
| 3102 | 1 | 3021 | 3012 |
| 3102 | 2 | 3102 | 3102 |
| 3102 | 3 | 1023 | 1023 |

What is claimed is:

1. A multiple-user priority network for controlling the priority of access to a common bus by a plurality of user devices that are capable of requesting such access during a sequence of access cycles comprising storage means for storing a current priority code representative of the current priority order of access of said user devices;

signal means for selectively supplying signals representative of the current request status of said user devices;

a first addressable memory means coupled to said storage means to receive said current priority code and to said signal means to receive said current request status signals for providing a stored access code in response thereto; and second addressable means coupled to receive said access code and said current priority code for providing a new priority code to said storage means for storage therein.

2. A method of controlling the priority of access to a common bus by a priority of user devices that are capable of requesting said access, comprising the steps of utilizing the current request status of said user devices and a current priority code which assigns access priority to said bus by said user devices to obtain a stored value representative of an access code, and utilizing said access code and said current priority code to obtain a stored value representative of a new priority code.

3. A multiple-user priority network for controlling the priority of access to a common bus by a plurality of user devices that are capable of requesting said access during a sequence of access cycles comprising

- storage means for storing a current priority code representative of the current priority order of access to said user devices;
- signal multiplexing means for selectively supplying signals representative of either the current request status of said user devices or of a stored access code;
- a first addressable memory means coupled to said storage means to receive said current priority code and to said signal multiplexing means to receive said current request status signals for providing said access code in response thereto;
- second storage means coupled to said first memory means for temporarily storing and for supplying said access code to said signal multiplexing means;
- second addressable memory means coupled to receive said access code and said current priority code for providing a new priority code to said storage means for storage therein; and
- timing means coupled to said second storage means and to said signal multiplexing means for controlling the operation of said signal multiplexing means and said second storage means so that said signal multiplexing means can first supply said current request status signals to said first addressable memory and then supply said access code to said second addressable memory during each access cycle.

* * * * *